United States Patent
Monti

(10) Patent No.: US 9,500,412 B2
(45) Date of Patent: Nov. 22, 2016

(54) APPARATUS AND METHOD FOR POSITIONING LANCES OF ELECTRIC ARC FURNACE, ELECTRIC ARC FURNACE COMPRISING SUCH APPARATUS

(71) Applicant: TENOVA S.P.A., Milan (IT)

(72) Inventor: Nicola Monti, Paderno Dugnano (IT)

(73) Assignee: TENOVA S.P.A., Milan (IT)

(*) Notice: Subject to any disclaimer, the term of this patent is extended or adjusted under 35 U.S.C. 154(b) by 269 days.

(21) Appl. No.: 14/356,860

(22) PCT Filed: Nov. 6, 2012

(86) PCT No.: PCT/IB2012/002245
§ 371 (c)(1),
(2) Date: May 7, 2014

(87) PCT Pub. No.: WO2013/068807
PCT Pub. Date: May 16, 2013

(65) Prior Publication Data
US 2014/0312540 A1  Oct. 23, 2014

(30) Foreign Application Priority Data
Nov. 7, 2011  (IT) .................................. MI11A2020

(51) Int. Cl.
*F27B 3/22* (2006.01)
*C21C 5/52* (2006.01)
*F27B 3/08* (2006.01)

(52) U.S. Cl.
CPC . *F27B 3/22* (2013.01); *C21C 5/52* (2013.01); *C21C 5/5217* (2013.01); *F27B 3/085* (2013.01); *F27B 3/225* (2013.01); *Y02P 10/216* (2015.11)

(58) Field of Classification Search
CPC ............. C21C 5/5217; C21C 5/52; F27B 3/22
(Continued)

(56) References Cited

U.S. PATENT DOCUMENTS 3,342,471 A * 9/1967 Preston ................. C21C 5/4606
266/158
4,653,730 A * 3/1987 Wunsche .............. C21C 5/5217
266/225
(Continued)

FOREIGN PATENT DOCUMENTS

JP     06-287624 A    10/1994
JP     09-292289 A    11/1997
JP     2000-303115 A  10/2000

OTHER PUBLICATIONS

International Search Report, dated Jan. 2, 2013.

*Primary Examiner* — Scott Kastler
(74) *Attorney, Agent, or Firm* — Hedman & Costigan, P.C.; James V. Costigan; Kathleen A. Costigan

(57) ABSTRACT

A positioning apparatus (100,100',100") for steelmaking lances (300) of an electric arc furnace (200) comprising:—a supporting structure (150,150') for a steelmaking lance intended to be introduced into said furnace (200) through an opening (230) of said furnace—a linkage (110;120;130;160) associated to said supporting structure (150,150') and intended to position a carriage (115) linearly movable with respect to said linkage (110;120;130;160) wherein said linkage (110;120;130;160) is an articulated quadrilateral intended to cause said at least one steelmaking lance (330) to be moved from a parking position outside said electric arc furnace to an operating position wherein at least a part of said lance is inside said electric arc furnace and said positioning apparatus (100,100',100") further comprises rotation means to cause at least said carriage (115) to rotate about an axis (X) substantially vertical in the assembly condition.

16 Claims, 9 Drawing Sheets

(58) Field of Classification Search
USPC .......................................................... 266/226
See application file for complete search history.

(56) References Cited

U.S. PATENT DOCUMENTS

| | | | | |
|---|---|---|---|---|
| 4,747,582 A | * | 5/1988 | Bergstrom | ............... C21C 5/462 |
| | | | | 266/226 |
| 2014/0312540 A1 | * | 10/2014 | Monti | ................... C21C 5/5217 |
| | | | | 266/44 |

* cited by examiner

APPARATUS AND METHOD FOR POSITIONING LANCES OF ELECTRIC ARC FURNACE, ELECTRIC ARC FURNACE COMPRISING SUCH APPARATUS

TECHNICAL FIELD

The present invention relates to the metallurgy field, particularly to steelmaking by means of systems provided with electric arc furnaces (EAFs).

A particular type of furnace, to which the present invention is advantageously applied, is that of tilting EAFs: these furnaces, in operation, follow an oscillation driven about a horizontal axis, being tilted by about 15°.

However it has to be noted now that though the main advantages of the present invention are achieved in the case of tilting furnaces, however it is advantageously usable even in the case of conventional EAFs.

In this field, it is well known the importance of injecting a specific material (such as oxygen, graphite or other materials containing carbon, fines containing calcium) in order to trigger chemical reactions required in steelmaking processes.

Such injection is usually made by the so-called "lances" that thus are able to integrate the electric energy produced by electric arcs of electrodes adding chemical energy to the system, to introduce free oxygen in the furnace for converting CO (a by-product of steelmaking reactions) into C02 (to produce additional heat), to inject elements for causing the slag to foam in order to improve the stability of the electric arc and in order to keep it covered improving the heat transfer to the steel bath and to reduce heat losses towards the shell and the roof of the furnace, to inject elements in the molten metal for accelerating steel refining, to contribute in making the bath homogeneous by enhancing the stirring, etc.

All these actions can be performed by a plurality of lance types (that is consumable, movable, fixed, internal, external the furnace, etc.), all closely connected to the supporting structure that, ultimately, can be considered one of the most important means that allow lances to efficaciously perform their task.

The historical "slag door lance" was, by far, the most widespread type of lance. The relevant supporting structure had to allow the lance to reach a suitable point of the bath through a door that should have been used also for controlling the slag level in the de-slagging phase.

This means that the necessary length had to be measured in the order of many meters, making this structure heavy, with considerable limits in the injection position that can be reached, scarcely movable and placed far away from the furnace. In order to allow these lances to properly operate, moreover, it was necessary to "leave the door open" with consequent heat losses and a huge air flow rate in the environment entering the furnace. Another defect of this type of support was related to the injection angle: long arms led also to the fact that the angle between the lance and the theoretic bath plane had to be very different than the optimal one of 42÷45°.

Moreover the angle between the direction of the injected oxygen and the steel bath with a typical "slag door lance" cannot be kept constant as the height of the steel bath increases during the melting period.

PRIOR ART

The technological development meets the mentioned drawbacks in different manners. For example, the application KR20040091373A (Kim Chan Su et alii) suggests to close the port through which the lance is introduced by a rotary frame that blocks the port but this solution leaves all the other defects unsolved.

Another example should be considered which is mentioned in the patent Gitman U.S. Pat. No. 5,843,368 wherein a very complicated structure allows the lance to form a step angle with the bath.

The same patent describes another path to be followed: the use of "internal lances". In this case "internal" means that the lances are fitted on the furnace support represented by the shell of the EAF or also by the side wall.

This type of solution allows lances to move with the furnace guaranteeing an optimal injection angle in all the steelmaking cycle phases.

On the other hand this "closeness" to the bath involves reagents (for example oxygen) to be injected near the refractory lining. This, in turn, could increase the erosion of the refractory lining and reduce the service life of the furnace.

Moreover the assembly position of the lance, which has to be fixed, can be optimized for the injection of elements while the stirring effect remains localized in a small area of the steel bath near the injection point.

Other structures and relevant lances that over time have suggested an improvement to the basic idea can be listed as follows:

The document DE 4 034 809 A1, to BEDA Oxygentechnik Armaturen GmbH, describes a traditional "slag door" supporting structure based on a tower with height adjustment and which rotates round its longitudinal axis on a motor trolley. A pair of arms provided with a lance are rotatable in an adjustable manner with respect to the tower; the lance holders are moved into position by feed motors and the rear wheels of the trolley are powered by an electric motor; the arms swing in fork mountings with a hydraulic cylinder to adjust the setting angle.

In addition to the rather cumbersome dimension of the trolley, the tower supported thereon has an overall dimension external to the furnace that is too much remarkable for many applications and, moreover, the means for adjusting the position have to be provided completely coordinated by the electronics; this finally leads to the fact of having a more complicated and, therefore, less reliable control system.

The document JP 2001-335825 to SINTOKOGIO Ltd describes a device for injecting oxygen and powdery material into the molten metal in the arc type electric furnace for steelmaking, which is still constituted of a carriage (the trolley in BEDA patent) which is formed so as to be freely moved at the front of the furnace; as it is clearly shown in FIG. 2 in the present application, the swing is obtained by said device by means of a joint that has its axis of rotation on the carriage—this similarly occurs substantially also for the longitudinal axis of the tower in BEDA patent.

The structures described in the above listed patents have to be mounted in workshops and have to operate through a wide opening in the furnace wall (as slag door). Both these solutions therefore mitigate but do not solve the defects previously listed, or they have other defects related to their manufacturing complexity.

Documents U.S. 2003/075843, U.S. Pat. No. 4,653,730 to EMPCO Ltd. as well as the document GB 1 519 854 to Siegerlander Kupferwerke GmbH describe an arcuate lance which pivots into and out of a small opening in the upper side wall of the shell.

Particularly the document U.S. Pat. No. 4,653,730 (specific for a BOF plant) describes many new solutions for traditional drawbacks mentioned above such as: it is a lance firmly fastened on the furnace platform (pivoting therewith), the curved shape allows the whole lance to enter the furnace through a small port arranged in a suitable part of the wall and it can be re-oriented (by pivoting its attachment) such to increase the mixing of the melt by angling the blowing tip.

However this solution provides many drawbacks.

First of all, the position of the lance tip (where the spreading nozzle is mounted) can follow only one specific path, therefore a great part of the bath cannot be reached and other areas can be reached with angled injection properties that are not optimized.

Particularly when devices continuously feeding the slag are used (the level increases over time), it is possible to trace the molten metal level but with a not optimized injection angle (that is at first vertical—without any stirring component).

Moreover the simplicity of the apparatus is only apparent considering the problems due to multi-coaxial curve tubes, coupled with a complicated BOF type tip.

Finally, these types of lances are designed and made suitably for the specific installation on which they will be used, with the consequence that it is not possible to use standardized components or lances, therefore running into higher costs.

Due to the above operations required in a EAF system, there is the need for a lance equipment able to be positioned and handled such to inject and blow desired materials (oxygen, materials containing carbon, fines, inert gases and the like) in specific points of the EAF for the whole length of the steel making cycle.

Such positioning apparatus, essentially, has to meet two contradictory problems: on one hand it has to guarantee a small overall dimension outside the furnace, on the other one it has to allow the widest operation area inside the furnace. As it can be directly found these objects lead to choices, as those discussed above, where a compromise between the two is tried to be achieved, therefore with not optimal results involving a high complexity and a high cost.

A further need is required for a lance apparatus to be suitably adapted to a EAF equipped with the Consteel® system—the same Applicant being the owner—using a conveyor for continuously feeding slag to the EAF, unlike a conventional top charge EAF of the single charge type.

OBJECTS AND SUMMARY OF THE INVENTION

The aim of the present invention is to overcome the prior art drawbacks.

The main object of the present invention is therefore to provide a positioning apparatus for steelmaking lances of an electric arc furnace arranged for minimizing the dimension required for the opening of the side wall through which said lances have access to the liquid bath.

A second object of the present invention is further to provide a positioning apparatus for steelmaking lance of an electric arc furnace wherein the minimized dimension of said opening of the side wall does not limit the ranges of the positioning angles permitted to the lance.

Another object of the present invention is to provide a positioning apparatus for steelmaking lances of an electric arc furnace mechanically automatized for positioning the tip of the lance into the liquid bath, thus not requiring a complex control of the positioning apparatus.

A further object of the present invention is to provide a positioning apparatus for steelmaking lances of an electric arc furnace arranged with respect to the EAF to which they are applied in such a way as to be tiltable therewith.

A further object of the present invention is to provide a positioning apparatus for steelmaking lances of an electric arc furnace allowing an easy maintenance of the EAF which typically consists in removing and replacing the furnace that is typically made of two parts that are the upper shell of the EAF (generally composed of water cooled panels) and of the vessel of the EAF (or refractory lining of the lower shell).

A further object of the present invention is to provide a method for positioning a steelmaking lance in an electric arc furnace from a first position outside the shell of said electric arc furnace to a second position in said shell, said method minimizing the manoeuvres of the lances and the space required for performing said manoeuvres.

Still another object of the present invention is to provide a steelmaking system comprising a EAF of the tilting type and a positioning apparatus for a lance that minimizes the space required for moving the latter, easy to be made and that can use conventional straight lances.

The idea at the base of the present invention is to make a positioning apparatus for straight steelmaking lances in an electric arc furnace of the tilting type, wherein the apparatus comprises a supporting structure for the lance associated to the furnace such to be tiltable with the latter in order to maintain an optimal injection angle regardless of the tilting.

The positioning apparatus advantageously comprises a linkage associated to the supporting structure and intended to position a carriage that slides with respect to the linkage itself.

Advantageously the linkage is an articulated quadrilateral intended to cause the lance to be moved from a position outside said furnace to an operating position wherein at least the front part of the lance is inside the furnace; advantageously, moreover, the positioning apparatus comprises rotation means to cause at least the carriage to rotate about a substantially vertical axis with the lance in the operating (or assembly) condition.

The term "substantially vertical" means an arrangement of said axis that is substantially parallel to the vector of the force of gravity with a possible tolerance of some degrees, preferably ±5°.

Thus the Applicant has noted that it is possible to limit the overall dimension and the complexity of the apparatus, thus obtaining a solution to the drawbacks described above.

Other objects of the present invention are a system comprising an electric arc furnace EAF for steelmaking and a positioning apparatus that consider the basic idea just described, and a method for positioning a lance in such steelmaking systems.

BRIEF DESCRIPTION OF THE DRAWINGS

The invention will be described below with reference to non-limiting examples, provided by way of example and not as a limitation in the annexed drawings. These drawings show different aspects and embodiments of the present invention and, where appropriate, like structures, components, materials and/or elements in different figures are denoted by like reference numerals.

DETAILED DESCRIPTION OF THE INVENTION

Figure 1:
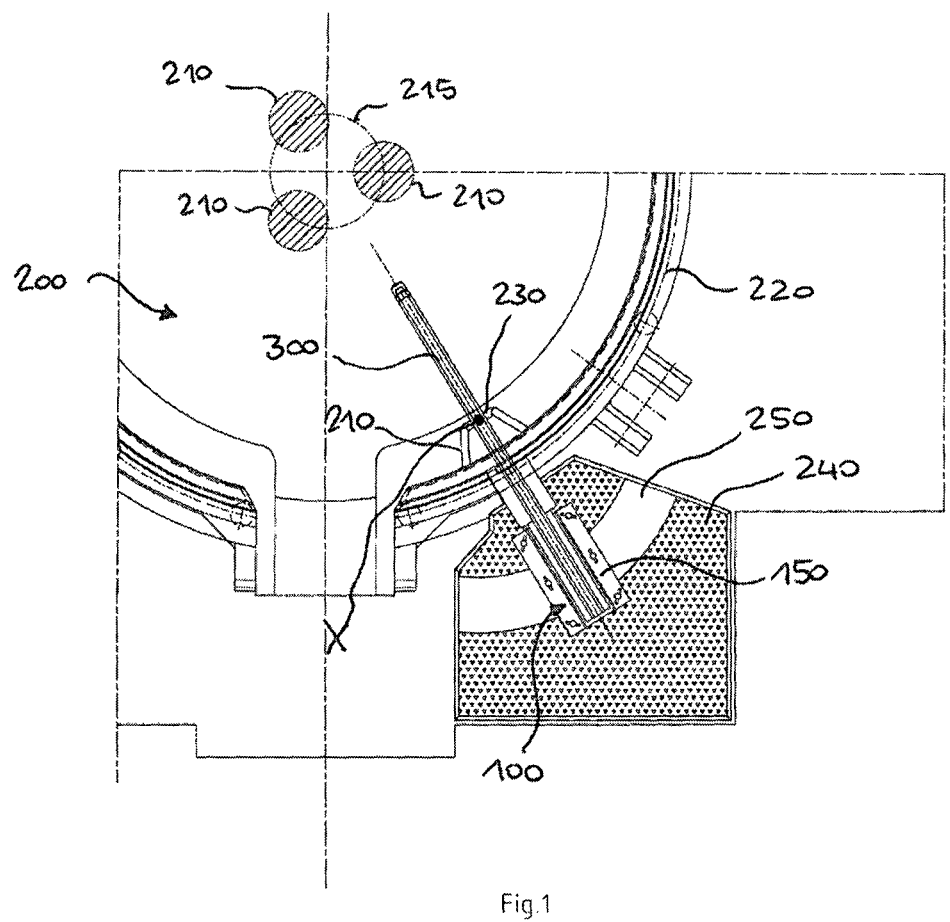
FIG. 1 is a plan view of a EAF equipped with the positioning apparatus according to the present invention showing lances supported thereon in its central operating position.

While the invention is susceptible of various modifications and alternative forms, some relevant embodiments are shown in the drawings and will be described below in detail.

It should be understood, however, that there is no intention to limit the invention to the specific embodiment disclosed, but, on the contrary, the intention of the invention is to cover all modifications, alternative forms, and equivalents falling within the scope of the invention as defined in the claims.

In the following description and in figures, similar elements are denoted by similar reference numerals. The use of "for example", "etc", "or" indicates nonexclusive alternatives without limitation unless otherwise noted. The use of "including" means "including, but not limited to," unless otherwise noted.

In principle and with reference to all the annexed figures, different embodiments of the present invention are shown therein, all sharing some characteristics that will be described just below, before going into the differences of each embodiment.

It is useful to specify that although the invention shows all the best advantages in the case of a tilting EAF, however it can be advantageously applied even to the case of conventional fixed, non tilting furnaces.

Below, by brevity purposes, examples of application to tilting furnaces will be shown, without considering it as a limitative intention as just mentioned.

Generally the positioning apparatus 100,100',100" for steelmaking lances 300 of a tilting electric arc furnace 200, is coupled to the furnace 200 such to be tiltable therewith.

The apparatus 100,100',100" comprises a supporting structure 150,150' for the lance 300 intended to be introduced in the furnace 200 through an opening 230 in its shell wall; the apparatus further comprises a linkage 110, 120, 130, 160 associated to the supporting structure 150,150' and intended to position a sliding carriage 115 upon which the lance 300 is fitted, preferably in a fixed manner.

According to the teaching provided herein the linkage 110, 120, 130, 160, is an articulated quadrilateral by means of which the lance 300 is moved from a first parking position, wherein the whole lance is outside (or external to) the volume of the furnace, to a second operating position, wherein at least the front portion of the lance is inside the volume of the electric arc furnace.

The use of an articulated quadrilateral already allows the overall dimensions of the apparatus to be reduced (and therefore of the system comprising such apparatus and the furnace) since the trajectories followed by the lance 300 during the movement develop in a compact manner very close to the furnace.

Moreover, advantageously, the positioning apparatus 100, 100',100" comprises rotation means for causing the carriage 115 to rotate about an axis X arranged substantially vertical in the assembly condition.

The axis X, that is to say, is the centre of rotation about which the carriage 115 supporting the lance 300 rotates.

The positioning of the axis X has a considerable importance as regards the two opposing purposes of compactness of the arrangement and the area covered by the lance tip in the bath during the rotation of the carriage 115.

The Applicant has found that such purposes are optimally achieved if the axis X is spatially located as it follows:

the axis X lies on a plane parallel to the one containing the movement trajectory of the rod 110 of the articulated quadrilateral 110, 120, 130, 160 or more preferably on the same plane the axis X is substantially vertical (with the meaning defined above) that is substantially parallel to the vector of the force of gravity Preferably, further, the axis X, with the lance in the operating condition (that is in the above mentioned second position), intercepts the straight line on which the rod 110 of the articulated quadrilateral develops at a distance (measured from the rod end closest to the furnace and in a direction perpendicular to the axis X—that is horizontally) not exceeding the thickness of the furnace wall.

Still more preferably, the axis X passes through or lies in a position close to the opening 230; with reference thereto it has to be noted that the term "opening" 230 means the port of the shell wall of the furnace through which the lance passes.

Such opening is therefore defined by the edges of the port, comprising also those defined by the cooling tube bundle delimiting it.

As it will be better seen below there are different solutions:

a preferred solution wherein the rotation means comprise a hinge 155 placed on the supporting structure 150: thus the whole articulated quadrilateral 110, 120, 130, 160 rotates such to cause the tip of the lance 300 to be placed inside the furnace;

a first variant, wherein the supporting structure 150' is fixed with respect to the furnace 200 and the rotation means comprise a rotating arm connected to the rod of the articulated quadrilateral 110, 120, 130, 160 on which the carriage bearing the lance is secured, such to cause the tip of the lance 300 to be placed inside the furnace following the movement of such rotating arm;

a second variant wherein the rotation means comprise a carriage on which the frame of the articulated quadrilateral 110, 120, 130, 160 is secured which moves, on curved rails about a centre of rotation (axis X), such to cause the tip of the lance 300 to be placed inside the furnace following the movement of the carriage.

With reference to the spatial arrangement of the axis X it has to be noted that, in the system comprising also the EAF, it is arranged such to intercept the furnace or it is arranged outside it at a distance approximately equal to that of the wall made of refractory material of the furnace.

Now more in details of the example, with reference to the FIG. 1, a tilting electric arc furnace EAF 200 is shown with a set of three vertical electrodes 210 placed symmetrically with respect to the centre of a circular path 215.

FIG. 1 shows also a positioning apparatus 100 according to a preferred embodiment of the present invention supporting a steelmaking lance 300 arranged in its operating position, that is inserted through an opening 230 of the top shell 220 of the EAF in the EAF 200.

The opening 230 to which reference is made is the port visible from the inside of the furnace and it does not exactly coincide with the shell wall area where the refractory material is not provided: such port on the contrary is defined by its edges delimited by the tube bundle of the cooling system.

It has to be noted now that the lance 300 is of the straight type, that is provided with a body containing inner ducts following a linear development inside it; such lances 300 generally are of the "standard" type that is ordinary in the sector of the art, therefore they are not further described.

Figure 2:
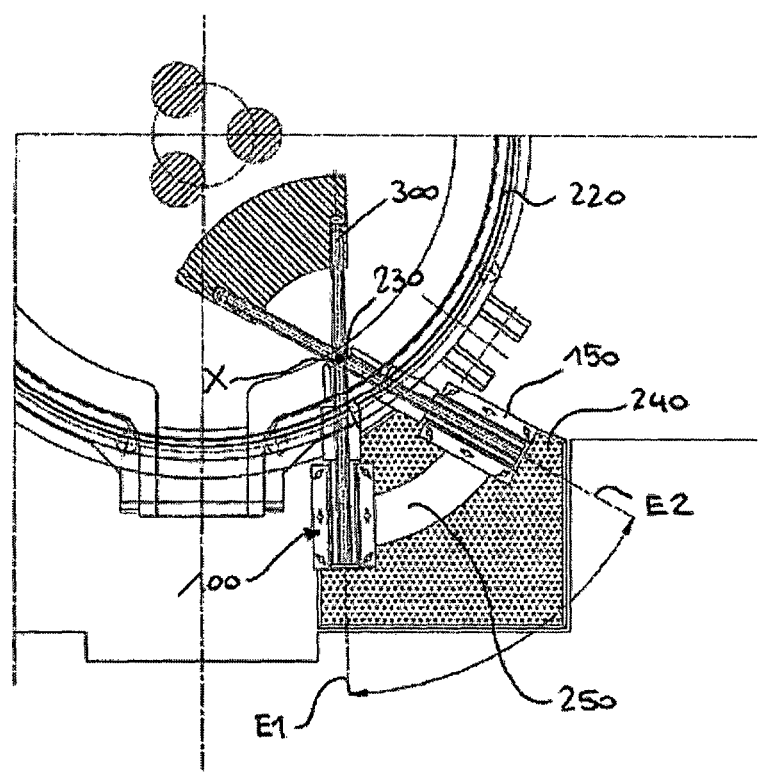
FIG. 2 is a plan view of the positioning apparatus of FIG. 1 showing the swing range within which the lance can be placed and the possible impact area of the injection of the lance during the melting cycle.

Now turning to FIG. 2, there is shown the range of the swing angle given to the positioning apparatus 100, such range being defined by directions E1 and E2 that the longitudinal axis of the steelmaking lance can take.

The corresponding swinging movement occurs by rotating the whole positioning apparatus 100 about a vertical axis X passing by the opening 230 of the upper shell 220 of the EAF.

Generally the swing angle between directions E1 and E2 is about 60 degrees.

Figure 3:
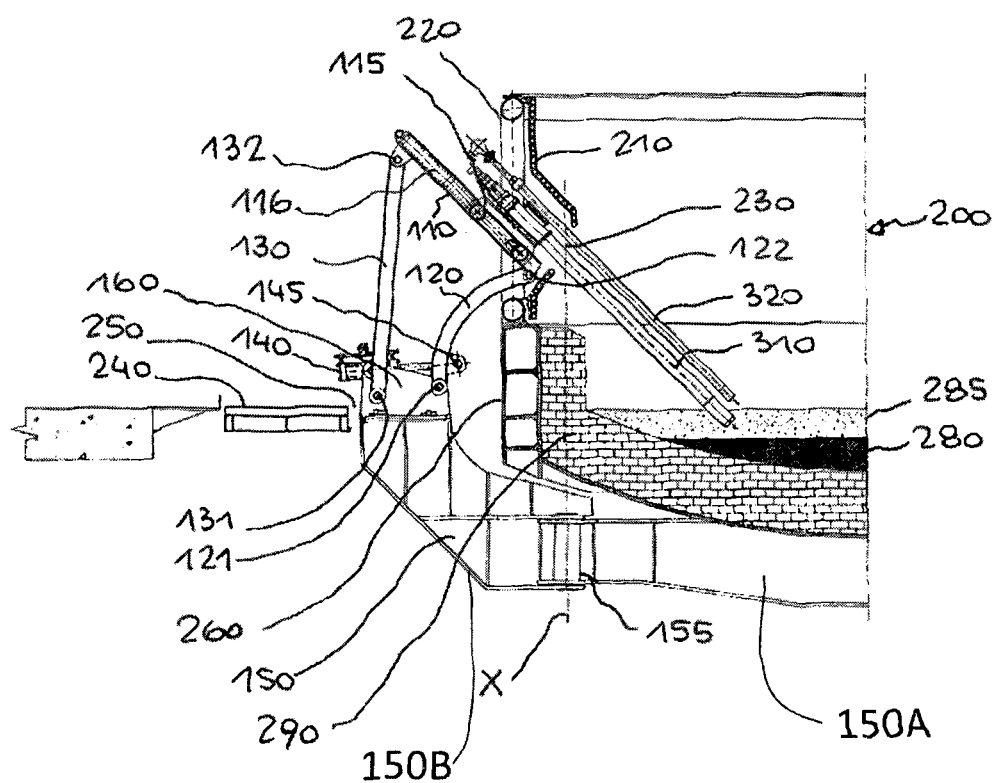
FIG. 3 is a enlarged side view of the positioning apparatus of FIG. 1 arranged in its final operating position.

With reference to FIG. 3, the positioning apparatus 100 comprises a partially rotating supporting structure 150 and an articulated quadrilateral supported thereon.

The structure 150 is articulated, meaning that it comprises a first portion 150A integral with the furnace 200 secured to the lower outer part of the lower shell 260 of the EAF and a second portion 150B rotatable with respect to the first one by means of a hinge 155 connecting them together.

The axis of said hinge is the axis of rotation X described above.

On the second portion 150B there is fastened a plate 160 preferably radially arranged with respect to said axis X.

The plate 160 is the frame of the articulated quadrilateral.

It comprises, in addition to the frame 160, two rocker arms 120, 130: a first end 121 of a first rocker arm 120 and a first end 131 of a second rocker arm 130 are hinged to the frame 160, the end 131 being farther from the axis X than the end 121.

The second ends 122 and 132 of said rocker arms 120 and 130, respectively, are in turn each one hinged to a rod 110 of the articulated quadrilateral, that in this embodiment is shaped as a rail such to allow the relative sliding of a carriage 115 thereon.

Finally, said steelmaking lance 300 is fastened on said carriage 115 and is movable thereon.

From the above, the positioning apparatus 100 described, and consequently, the lance 300, have three degrees of freedom:
 a first rotation of the portion 150A about the axis X,
 a second rotation of the rocker arm 120 about its first end 121 and
 the sliding of the carriage 115 along the rail 110.

Each one of the three degrees of freedom is controlled by driving means properly adapted to each joint or hinge: a first double-acting hydraulic cylinder (not shown) drives in a controllable manner the rotation of the first and second portions 150A and 150B about the hinge 155, a double-acting hydraulic cylinder 140 has its head 145 connected to the first arm 120 near its first end 121, while a telescopic hydraulic cylinder 16 drives the carriage 115 in its sliding arrangement.

Figure 4A:
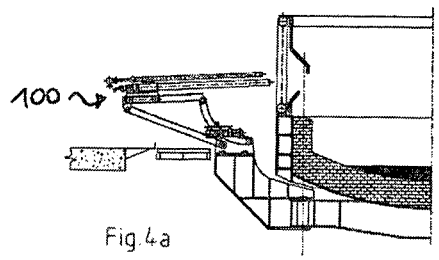
FIGS. 4a to 4r are side views of the positioning apparatus of FIG. 1 showing a cross-section view of the EAF equipped with said positioning apparatus with a set of positions reached by the lance when it is placed from a first parking position to an operating position during a complete melting cycle till the lance reaches again its parking position.
Figure 4B:
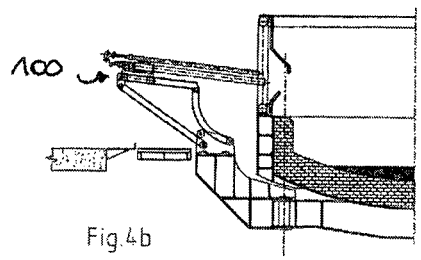
Figure 4C:
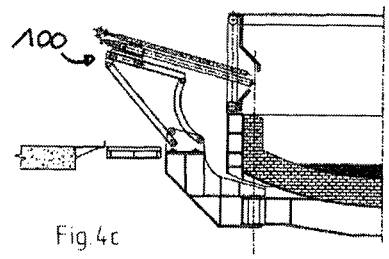
Figure 4D:
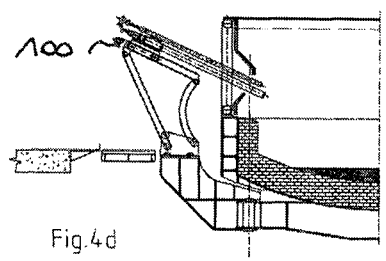
Figure 4E:
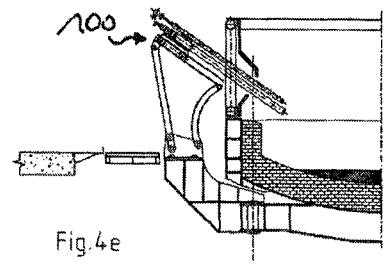
Figure 4F:
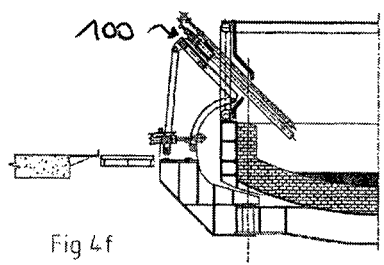
Figure 4G:
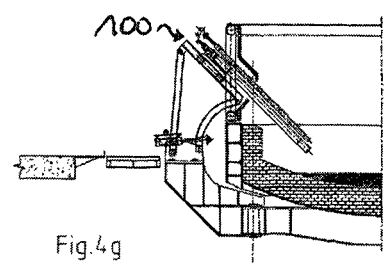
Figure 4H:
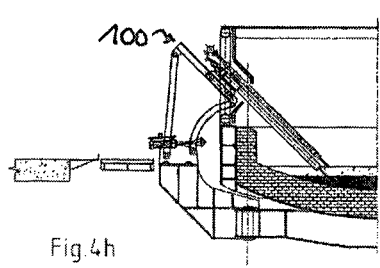
Figure 4I:
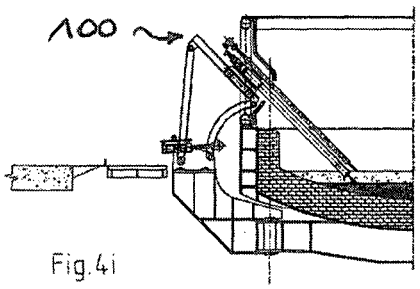
Figure 4L:
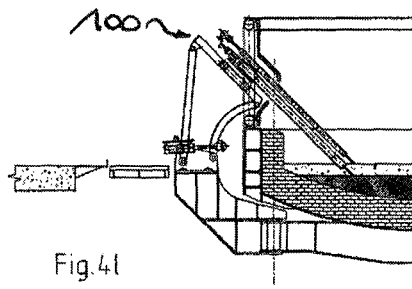
Figure 4M:
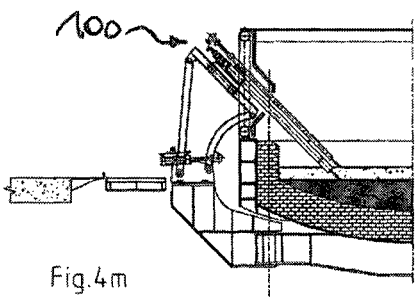
Figure 4N:
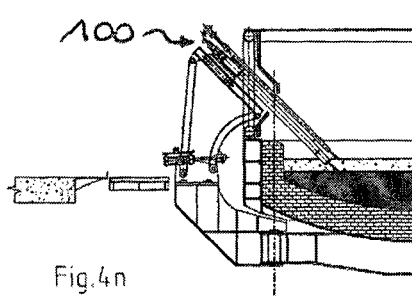
Figure 4O:
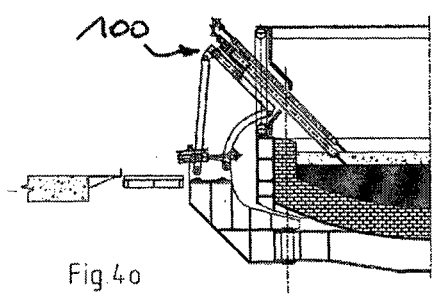
Figure 4P:
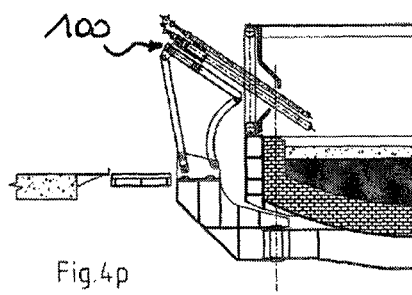
Figure 4Q:
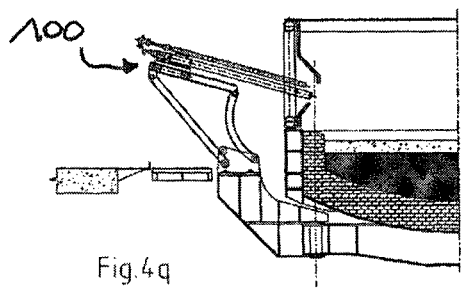
Figure 4R:
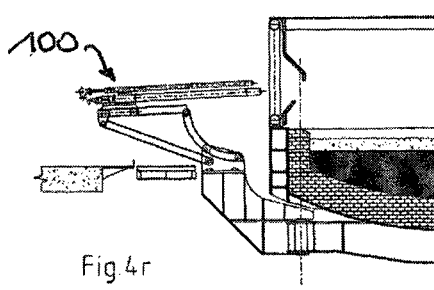

As it can be seen in FIGS. 4a to 4r, from an initial parking position (FIG. 4a) the steelmaking lance 300 reaches its upper position (FIG. 4f) passing through intermediate positions (shown in FIGS. 4b, 4c, 4d e 4e, for example).

Therefore the articulated quadrilateral composed in this manner can be designed so as to reach the uppermost position of the steelmaking lance 300 optimized on the basis of different parameters such as the dimension required for the opening 230, as already seen, the configuration adopted for the electrodes—or the shape and depth of the lower shell 240 of the EAF and of the upper shell 220.

Typically said upper optimized position is reached by an angle of rotation ranging from 40 degrees to 45 degrees: the previous range results from a balance between the minimum distance at which the lance tip has to be carried from the liquid steel bath 280 through the layer 285 of foamed slag and a kind of safety distance of the tip from the refractory lining 290. As it is known, the fact of blowing oxygen near said lining leads it to be rapidly worn out.

Moreover the dimensions of each arm 120 and 130, of the frame 160 and of the rail 110 can be suitably selected for minimizing the overall dimension of the positioning apparatus 100 depending on the space available in the plant around the furnace.

For example, the arm 120 of the preferred embodiment shown in the figures has an arcuate profile both in order to guarantee the necessary distance between the end 121 and the end 122 for the desired rotation and height of the rail 115 and in order to avoid the positioning apparatus 100 and the shell 200 from colliding.

Further the length of the rail 110, and therefore the travel of the carriage 115, can be designed such to allow the lance tip to reach the free surface of the liquid bath at any level thereof, maintaining an optimized path of the rail 110 during the rotation of the arm 120 from the parking position to the operating position: such path depends on the distance between the hinged ends 122 and 132.

FIGS. 4f to 4h show the sliding movement of the carriage 115 along the rail 110 once it is arranged in its operating position: the carriage 115 is advanced till the tip of the steelmaking lance 300—comprising a oxygen lance 310 and a lance 320 for supplying material containing carbon laying thereon—reaches a safety distance from the free surface of the steel bath 280.

The level of the steel bath increases as the process goes on and therefore the tip of steelmaking lances 300 has to be raised in agreement with the current level. During melting the level of the steel bath increases, and therefore, the tip of the lances 310 and 320 has to follow such displacement. This can be obtained simply by a backward movement of the tip of said steelmaking lances 300 by controlling a telescopic hydraulic cylinder 116 (or electric/hydraulic motor) driving the carriage 15: the height and the tilting angle of the rail 115 in the operating position have to be selected, in the designing phase, on the basis of the size and shape of the lower shell 260 thus envisaging the previous range of the rotation angle that has to remain fixed as the carriage 115 slides and according to the position of the liquid steel bath from the liquid foot (minimum distance) to the maximum level.

Again with reference to the previous figures, there is shown a cross-section view of the opening 230 of the side wall which is adjusted to the space taken by the steelmaking lances 300 once they are in the operating position, thus minimizing not only the heat losses but also the input of atmospheric air and, at the same time, leaving to the lances 310 and 320 the freedom to slide in and out therefrom and to rotate about the axis X such to cover all the injection area selected such to achieve the targets of the steelmaking process.

As it can be clearly seen the hinge 155 is placed with respect to the side wall 210 of the EAF 200 in such a way that the axis X, about which the hinge 150 rotates, is flush with the innermost part of the opening 230 of the side wall: according to such configuration of the hinge 150 the steelmaking lances 300 require a horizontal dimension as small as possible for the opening 230 that therefore allows minimum heat losses.

Figure 5:
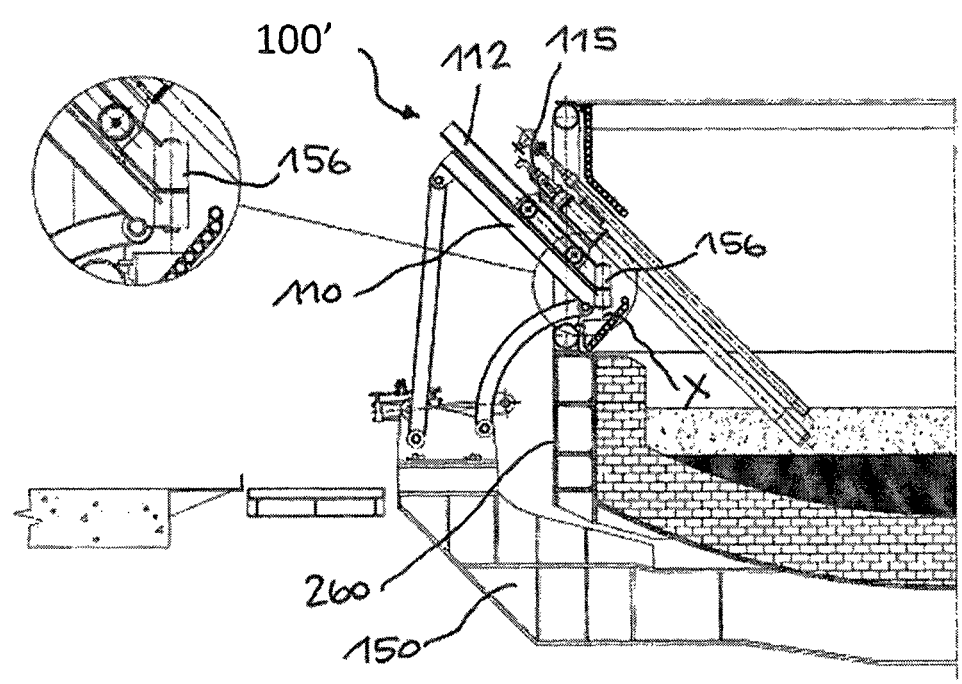
FIG. 5 is a partially sectional side view of a first variant of the present invention.

A first alternative embodiment of the invention is shown in FIG. 5.

Here the positioning apparatus 100' uses, instead of the articulated structure 150 with the hinge 155, a structure fixed with the furnace 150'.

In this case rotation means comprise the hinge 156 of FIG. 5 that articulates the rotating arm 112 on which the carriage 115 is arranged which is associated to the lance 300.

As it can be seen, due to the above, in this case the rotation of the lance 300 is guaranteed by the provision of the rotating arm 112, with a greater advantage as regards the handling of the structure 150' that, fixed on the furnace 200, only tilts together with the latter.

The axis of rotation X therefore coincides with the axis of the hinge 156: it has to be noted that in this solution it is arranged past the outer face of the furnace, towards its inside. This also guarantees the making of a smaller port, even if in case of a malfunction with the lance stopped in the angled position, there are some difficulties in taking it out.

Figure 6:
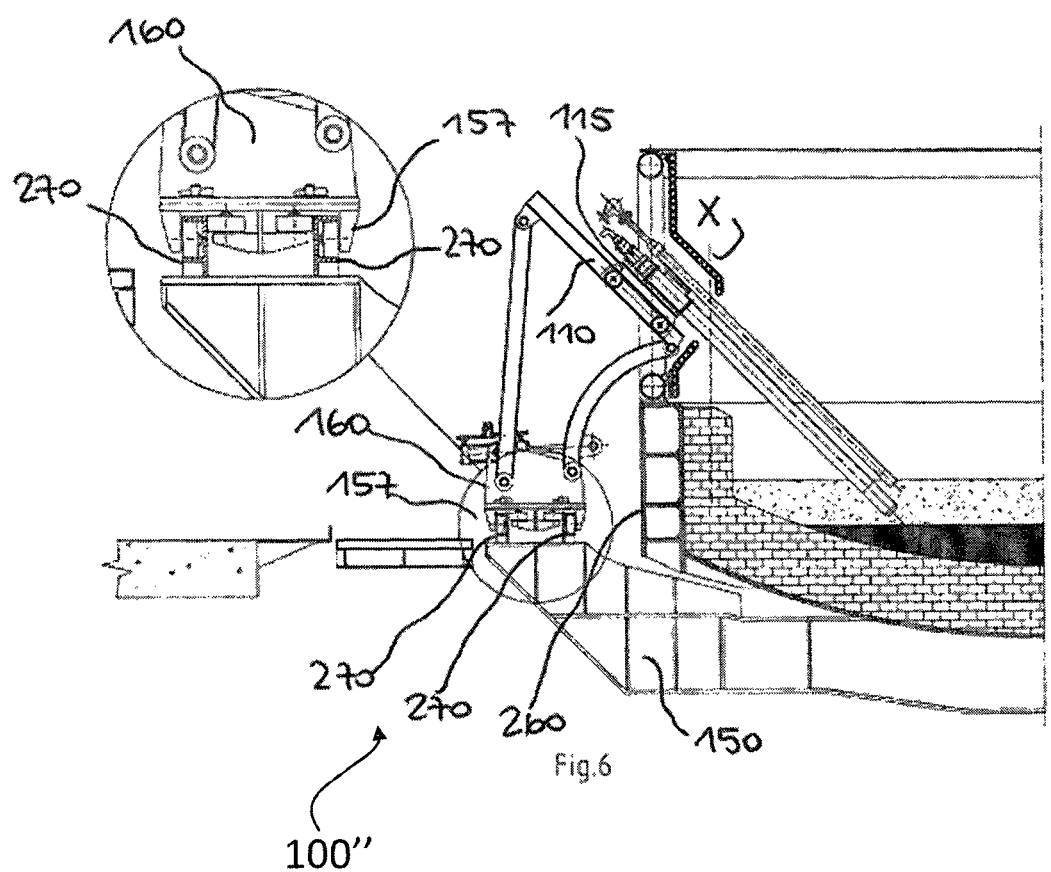
FIG. 6 is a partially sectional side view of a second variant of the present invention.
Figure 7:
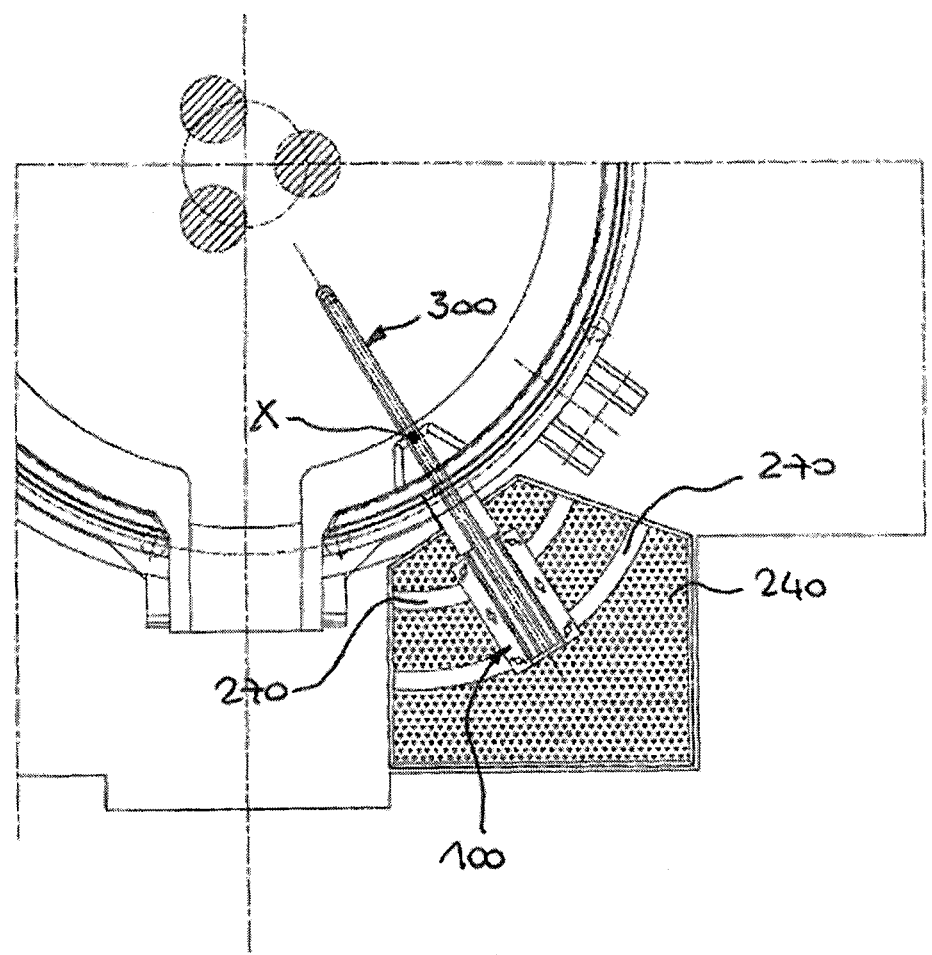
FIG. 7 is a partially sectional top view of the variant of the previous figure.

Finally, a second variant is shown in FIGS. 6 and 7: in this variant the axis X coincides with the centre of the trajectory of two rails 270 that develop on a circumference arc path and that can be run across by a movement carriage 157 that integrally bears the frame 160 of the articulated quadrilateral, such to guarantee the movement of the lance as a function of the movement of the whole articulated quadrilateral.

Again another embodiment of the positioning apparatus 100 has a telescopic arm 130 (not shown) as the second rocker arm that therefore replaces the second hinged arm 130 described for the preferred embodiment. This solution can be particularly useful in the case a further reduction of the radial space is desired. Moreover said telescopic arm 130 can be hydraulically driven as the driving tool instead of the hydraulic cylinder 140.

Figure 8:
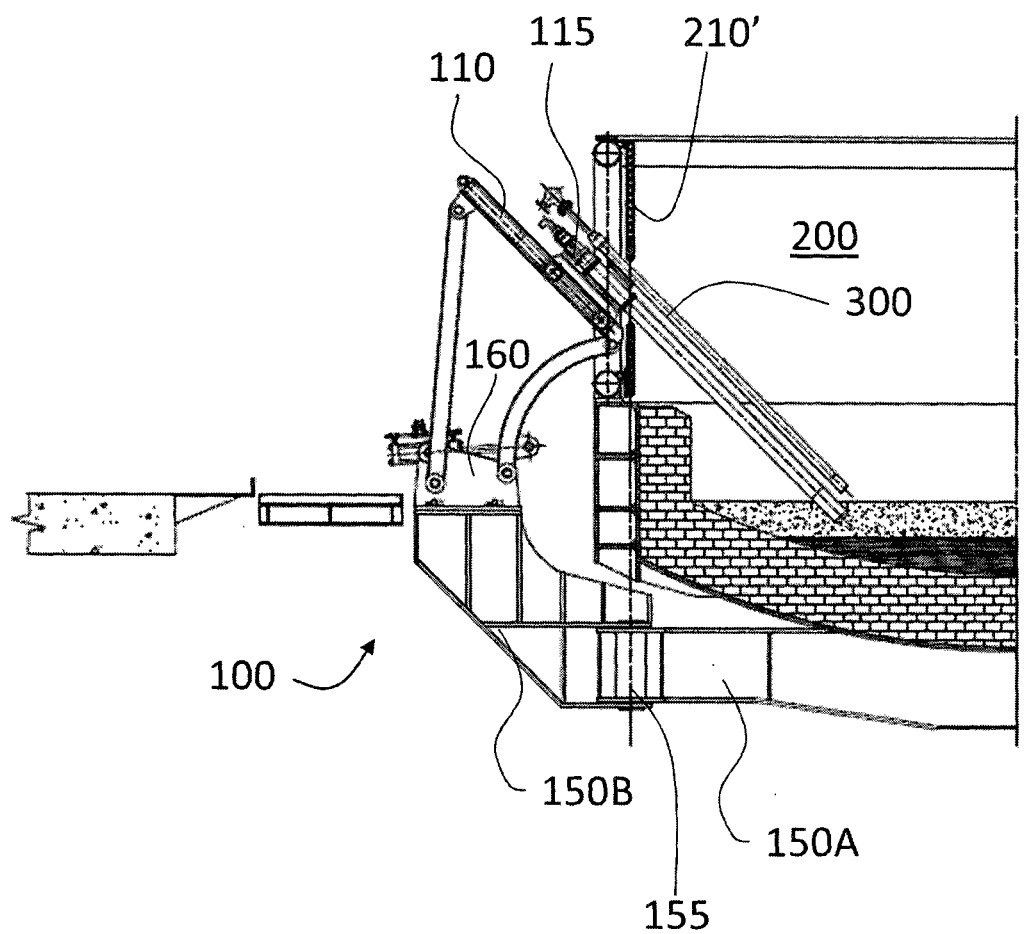
FIG. 8 is a further variant of the present invention.

Finally FIG. 8 shows a last variant, wherein an apparatus 100 as described above is used (even if even other apparatuses 100' and 100" may be similarly used).

In this case, the difference is the configuration of the inner wall of the furnace 210' near the area of the port or opening 230, that does not project, as in FIG. 1, to the inside of the furnace, but that on the contrary is substantially parallel to the refractory shell wall.

The present invention provides even a method for positioning steelmaking lances from a first position outside the shell of an electric arc furnace to a second position wherein at least the tip of said lance passes through an opening of said shell.

According to the method three different positions of the steelmaking lances are defined such to minimize the space outside the shell of the electric arc furnace where the lance has to be maneuvered.

Particularly the three previous positions are:

an initial position wherein the lance is completely outside the shell and it is parked near the shell opening;

an intermediate position wherein said lance has entered said opening and is faced normal to the opening of the shell, or anyway, faced such to block as more as possible the opening itself;

a final operating position wherein said lance is faced such to approximately reach the lower part of the vessel of the EAF or alternatively the free surface of the steel bath at a level corresponding to the charge of new slag.

The method further provides the lance to slide once it is arranged in the final operating position and also the swinging of the lance about an axis coplanar to the longitudinal axis of the shell and passing through said opening.

A forward sliding movement, combined with a swing towards a direction that depends of the type of slag charge, allows the lance to reach said free surface and to foam the slag by injecting material containing carbon.

A backward movement of the lance, again combined with its swing, is performed on the contrary in order to follow said free surface as its level increases and for maintaining the slag layer foamy.

A further swing of the lance can be used and suitably controlled for mixing the steel bath that, as it is known, leads to an homogeneity of temperature and composition. According to the present method a swing axis passing through the opening of the side wall is preferred since it requires the smallest size of the opening thus reducing the entry of false air that is harmful for the quality of the final product, and for the energy consumption.

With reference to the returning/insertion movement of the lance, a non-limiting example of the calculation that can be made, should be the following:

starting considering that the opening of the side wall can be defined as the focus of a family of lines describing the direction of the support during its trajectory.

This guarantees lances to be taken out even in case of a damage in the lance sliding.

For convenience purposes, the movement of the hinge near the furnace is considered as a circumference portion generated by the closest (to the furnace) supporting arm of the two supporting arms (for simplicity reasons, the centre of this circumference should be selected such to be the origin of the pair of Cartesian axes-particularly: x as the distance from the furnace and y as the height—where whole the system is described).

As additional conditions, it is necessary that the line describing the support through the direction of the focus in the "operating mode" has a pitching of 45° and, under the same conditions, that the hinge closest to the furnace coincides with the focus.

Moreover, in the non-operating condition, the support is horizontal (always pointing at the focus) on the other side of the circumference.

The radius of such primary circumference R (equal to the real length of the arm closest to the furnace) is therefore given by the distance, from the furnace, desired to be reached by the lance in the non-operating position.

Supposing 45° of the tangent in the focus it leads to a movement of $R\sqrt{2}$ of the support end.

Therefore it is possible, under these conditions, to completely characterize the primary circumference (both in the radius and in the centre).

In order to define the secondary circumference (the trajectory of the supporting hinge farthest from the furnace) describing the length and the centre of rotation of the second (farthest) supporting arm, the following steps are made (obviously the length of sliding depends on the choice of the lances to be fitted: in this case, for general purposes, let this length be equal to M):

1. We can find a first point of the second circumference considering the support in the operating condition, thus with a tangent to the primary circumference (which by choice has the centre in the origin of the reference axes s)) inclined at 45°: the primary hinge is therefore placed at $x=R/\sqrt{2}$ and $y=R/\sqrt{2}$. Banal geometrical considerations allows the first point corresponding to the secondary one to be defined (the position of the farthest hinge of the secondary one) at:

$$X_1=(R-M)/\sqrt{2}, Y_1=(R+M)/\sqrt{2}$$

2. Finding a second point of the secondary circumference considering the non-operating position (horizontal and symmetric with respect to the operating point—as for the primary circumference): the primary hinge is then placed in $x=-R/\sqrt{2}$ and $y=R/\sqrt{2}$. The secondary hinge then can be placed in:

$$X_2=(-R/\sqrt{2})-M \text{ and } Y_2=R/\sqrt{2}$$

3. Finding a third "intermediate" point (that is at $x=0; y=R$ of the primary circumference) by imposing a line containing both the "intermediate" point and the focus point ($x=R/\sqrt{2}; y=R/\sqrt{2}$). Once the equation of this line is defined, it is possible to identify a point $X_3; Y_3$ distant M from the primary "intermediate" point. Then the calculation leads to $$X_3=-M/\sqrt{2(2-\sqrt{2})} \text{ and}$$

$$Y_3=R-M(1-\sqrt{2})/\sqrt{2(2-\sqrt{2})}$$

All these three points can be used for univocally describing a circumference in its analytic form.

This secondary circumference, on which the trajectory of the second hinge lies, defines both a real length of the secondary arm and its centre of rotation (that is its position with respect to the primary centre—the origin, in this case). Therefore the data for the whole design have been obtained.

Moreover, the positioning method previously described allows the corresponding positioning apparatus to be designed in an optimized manner: said parking, intermediate and operating positions can be used for a synthesis of a linkage able to move one of its arms, more generally its body, in each one of said specific positions along a continuous path.

Different techniques are known in designing mechanisms for solving linkage synthesis problems, as the exact position approach, the path optimization approach or also combinations thereof and they can be used depending on the design object.

For example a combined approach can be used for designing an articulated quadrilateral according to the preferred embodiment previously described of the positioning apparatus that places the lance at the three (parking, intermediate and operating) positions through an optimized path so as to be contained and limited in a small space around the shell of the EAF.

Still according to the method the lance swing can be performed by a suitable rotation joint connecting the whole positioning apparatus to the vessel of the EAF: this characteristic applies particularly to the positioning of steelmaking lances, according to the method and apparatus of the present invention, in the intermediate position wherein the opening of the shell is blocked and the melted steel can be poured by tilting the furnace. This is an effective improvement with respect to prior art, especially as regards down time, since it prevents the lance from being necessarily placed outside the shell in the parking position and it allows it to be positioned again very quickly in its operating position.

The previous detailed description of the preferred embodiment of the positioning apparatus and of the method according to the present invention therefore solves the drawbacks of prior art devices and apparatuses by providing a compact positioning apparatus having also simple control requirements and a high maneuverability level of the lances, but at the same time, it is able to reduce at the greatest extent issues related to the dimension of the opening of the side wall with positive effects as regards energy saving and product quality.

Moreover, the mixing operation can be efficaciously performed by swinging the lances which provides, when supplying the mixing agent from the lance tip, a tangential movement of the liquid bath. During melting the position of the lance tips with respect to the liquid bath can be adjusted continuously by simply controlling the sliding of the carriage along the rail, at the same time by maintaining the angle of the operating position optimized. Therefore all the necessary operations involving the impingement of the bath by gaseous jets, the cutting of the slag or also the mixing under the surface of the molten steel can be efficaciously and easily performed. Finally it has to be highlighted the tilting of the present positioning apparatus integrally with the furnace therefore eliminating the down time related to prior art apparatuses and it allows the invention to be suitably applied to a continuous slag feeding system as the already mentioned Consteel® system.

The invention claimed is:

1. Positioning apparatus for steelmaking lances of an electric arc furnace comprising:
    a supporting structure for a steelmaking lance adapted for introduction intended to be introduced into said furnace through an opening of said furnace
    a linkage associated to said supporting structure and that is adapted to position a linearly movable carriage on said linkage
    wherein said linkage is an articulated quadrilateral linkage adapted to cause a steelmaking lance to be moved from a parking position outside said electric arc furnace to an operating position wherein at least a part of said steelmaking lance is inside said electric arc furnace and
    said positioning apparatus further comprises rotation means to cause at least said carriage to rotate about a substantially vertical axis in.

2. Apparatus according to claim 1, wherein said furnace is a tilting furnace and said apparatus is tiltable together with said furnace.

3. Positioning apparatus according to claim 1, wherein said articulated quadrilateral linkage comprises a rod intended to follow a trajectory on a first plane and wherein said substantially vertical axis lies on a second plane parallel or coincident with said first plane.

4. Positioning apparatus according to claim 1, wherein said rotation means comprise a first portion of said structure and a second portion reciprocally articulated through a hinge, said articulated quadrilateral linkage being integral with said second portion.

5. Positioning apparatus according to claim 1, wherein said rotation means comprise a rotating arm articulated to said articulated quadrilateral linkage by means of a hinge having as a rotation axis said axis, said carriage being coupled to said rotating arm.

6. Positioning apparatus according to claim 1, wherein said rotation means comprise a carriage integral with a frame of said articulated quadrilateral linkage and slide rails for said carriage, said slide rails being developed along an arc of circumference of said substantially vertical axis.

7. Positioning apparatus according to claim 1 wherein at least one rocker arm of said articulated quadrilateral linkage has an arcuate development.

8. Steelmaking system comprising at least one electric arc furnace wherein said electric arc furnace is a tilting furnace, comprising a shell wall equipped with at least one opening for the selective introduction of a lance, and at least one lance and a positioning apparatus for said lance, said positioning apparatus being made according to claim 1.

9. Method for positioning a steelmaking lance of an electric arc furnace from outside of said electric arc furnace in at least one opening of said electric arc furnace wherein
said steelmaking lance is moved in a planar motion through:
a first parking position to
an intermediate position wherein said steelmaking lance extends to said at least one opening and to
a final operating position that allows for a continuous blowing of a foamy slag surface in said electric arc furnace and a sliding of said steelmaking lance along said final operating position,
swing rotating said steelmaking lance on a rotation joint past least about an axis of swing rotation that is coplanar to a longitudinal axis of said electric arc furnace,
wherein said planar motion is made by a flat linkage that slidably supports said steelmaking lance and places it in said first parking position, intermediate position and final operating position, respectively, said linkage being supported by a hinge structure connected to said electric arc furnace.

10. Method according to claim 9, wherein said final operating position is selected in a range from 40 degrees to 45 degrees.

11. Method according to claim 9, wherein said axis of swing rotation is parallel to said longitudinal axis of said electric arc furnace.

12. Positioning apparatus according to claim 2 wherein at least one rocker arm of said articulated quadrilateral linkage has an arcuate development.

13. Positioning apparatus according to claim 3 wherein at least one rocker arm of said articulated quadrilateral linkage has an arcuate development.

14. Positioning apparatus according to claim 4 wherein at least one rocker arm of said articulated quadrilateral linkage has an arcuate development.

15. Positioning apparatus according to claim 5 wherein at least one rocker arm of said articulated quadrilateral linkage has an arcuate development.

16. Positioning apparatus according to claim 6 wherein at least one rocker arm of said articulated quadrilateral linkage has an arcuate development.

* * * * *